US010730008B2

(12) United States Patent
Schaumann et al.

(10) Patent No.: US 10,730,008 B2
(45) Date of Patent: Aug. 4, 2020

(54) DEVICE FOR DEHUMIDIFICATION, ELECTRIC APPLIANCE HAVING A DEVICE OF THIS KIND AND METHOD FOR DEHUMIDIFICATION

(71) Applicant: E.G.O. Elektro-Geraetebau GmbH, Oberderdingen (DE)

(72) Inventors: Uwe Schaumann, Oberderdingen (DE); Wolfgang Thimm, Karlsruhe (DE); Lutz Ose, Sternenfels (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 222 days.

(21) Appl. No.: 15/888,500

(22) Filed: Feb. 5, 2018

(65) Prior Publication Data
US 2018/0221814 A1 Aug. 9, 2018

(30) Foreign Application Priority Data
Feb. 8, 2017 (DE) .................... 10 2017 202 007 U

(51) Int. Cl.
*D06F 58/24* (2006.01)
*A47L 15/48* (2006.01)
(Continued)

(52) U.S. Cl.
CPC ........ *B01D 53/261* (2013.01); *A47L 15/0013* (2013.01); *A47L 15/0047* (2013.01);
(Continued)

(58) Field of Classification Search
CPC ............. A47L 15/0013; A47L 15/0047; A47L 15/418; A47L 2501/10; B01D 53/02;
(Continued)

(56) References Cited

U.S. PATENT DOCUMENTS 4,391,616 A * 7/1983 Imamura .............. B01D 53/261
 95/92
10,188,262 B2 * 1/2019 Jerg .................... A47L 15/4291
(Continued)

FOREIGN PATENT DOCUMENTS

DE 102014222400 A1 5/2016
EP 2353487 A2 8/2011
(Continued)

OTHER PUBLICATIONS

Nune, Satish K., et al., "Anomalous water expulsion from carbon-based rods at high humidity", Nature Nanotechnology, Jun. 13, 2016, pp. 791-797, vol. 11, www.nature.com/naturenantechnology.

*Primary Examiner* — Frank M Lawrence, Jr.
(74) *Attorney, Agent, or Firm* — Alston & Bird LLP

(57) ABSTRACT

A device for the dehumidification of air in a processing space of a dishwasher is connected in an air-conducting manner to the processing space of the electric appliance. The device includes carbon-based fibres, which are designed as a fibre unit. The fibre unit is arranged between the processing space or an air duct connected thereto and at least one dehumidification chamber of the device. The carbon-based fibres absorb moisture from the air of the processing space, which they then release again in the dehumidification chamber. During this process, the carbon-based fibres are moved backwards and forwards between the processing space or air duct and the dehumidification chamber, preferably by slow rotation on a support.

18 Claims, 3 Drawing Sheets

(51) Int. Cl.
*B01D 53/26* (2006.01)
*B01D 53/28* (2006.01)
*B01D 53/06* (2006.01)
*B01J 20/20* (2006.01)
*B01J 20/28* (2006.01)
*B01J 20/34* (2006.01)
*A47L 15/00* (2006.01)

(52) U.S. Cl.
CPC ............ *A47L 15/481* (2013.01); *B01D 53/06* (2013.01); *B01D 53/28* (2013.01); *B01J 20/20* (2013.01); *B01J 20/28023* (2013.01); *B01J 20/3416* (2013.01); *B01J 20/3483* (2013.01); *D06F 58/24* (2013.01); *A47L 2501/10* (2013.01); *B01D 2253/102* (2013.01); *B01D 2257/80* (2013.01); *B01D 2259/40088* (2013.01)

(58) Field of Classification Search
CPC ...... B01D 53/04; B01D 53/06; B01D 53/261; B01D 53/28; B01D 2253/102; B01D 2257/80; B01D 2259/40088; B01J 20/20; B01J 20/28023; B01J 20/3416; B01J 20/3483; D06F 58/24
USPC ............ 95/107, 113, 117, 126; 96/125, 146; 34/80, 472, 473
See application file for complete search history.

(56) References Cited

U.S. PATENT DOCUMENTS

| | | | |
|---|---|---|---|
| 2008/0276484 A1* | 11/2008 | Dewald, III | D06F 58/24 34/437 |
| 2011/0186094 A1 | 8/2011 | Hong | |
| 2015/0020398 A1* | 1/2015 | Bae | D06F 58/02 34/74 |

FOREIGN PATENT DOCUMENTS

| | | | |
|---|---|---|---|
| JP | 2009-285225 | * | 12/2009 |
| JP | 2010-094247 | * | 4/2010 |
| WO | WO 2013/097975 A1 | | 7/2013 |

* cited by examiner

DEVICE FOR DEHUMIDIFICATION, ELECTRIC APPLIANCE HAVING A DEVICE OF THIS KIND AND METHOD FOR DEHUMIDIFICATION

CROSS-REFERENCE TO RELATED APPLICATIONS

This application claims priority from German Application No. 10 2017 202 007.5, filed Feb. 8, 2017, the contents of which are hereby incorporated herein in its entirety by reference.

BACKGROUND

The invention relates to a device for the dehumidification of air in an electric appliance or in a processing space of an electric appliance, to an electric appliance provided with a device of this kind and to a method for operating a device of this kind or an electric appliance of this kind for dehumidification.

WO 2013/097975 A1, for example, discloses the provision, on a washing machine, of a device for dehumidification, which is connected in an air-conducting manner to a drum as a processing space of the washing machine. Here, the device has a permanently installed container, in which a zeolite is arranged. In general, this zeolite reversibly absorbs moisture and has very good characteristics, as known per se from the rest of the prior art. By means of a fan, air can be passed from the drum through the zeolite and is then dehumidified or dried there. Regeneration of the moisture-laden zeolite can then take place subsequently. During moisture absorption in the zeolite, heat is simultaneously released into the environment, and this can be used to heat the air. For regeneration, a heating element can furthermore additionally be used under some circumstances.

The journal "Nature Nanotechnology 11" 2016, pages 791 to 797, includes the article "Anomalous water expulsion from carbon-based rods at high humidity" by Satish K. Nune et al., see doi:10.1038/nnano.2016.91. This describes how carbon-based material, particularly fibres, has the property of being able to absorb water at even low relative humidity and of being able to release it again even at a high relative humidity of 50% to 80%. This process can be reversed at any time, and it can be assisted or accelerated by drying by means of heating.

BRIEF SUMMARY

It is the underlying object of the invention to provide a device mentioned at the outset, an electric appliance and a method for operating same, by means of which problems of the prior art can be solved and by means of which, in particular, it is possible to perform dehumidification of air in an electric appliance quickly, in an energy-saving manner and in a practical way.

This problem is solved by a device, by an electric appliance, and by a method. Advantageous and preferred embodiments of the invention form the subject matter of the other claims and are explained in greater detail below. Here, some of the features are described only for the device, only for the electric appliance or only for the method. Irrespective thereof, however, it should be possible to apply them to the device, to an electric appliance provided therewith and to a corresponding method independently of one another and in a stand-alone way. The claims are worded with explicit reference to the contents of the description.

Provision is made for the device to be arranged in an electric appliance, which has a processing space, which, in particular, is a cooking space in an electric appliance for cooking or a cooking appliance or is a chamber in an electric appliance intended for processing washing or dishes, in particular a washing machine or a washer-dryer. The device can be connected or is connected in an air-conducting manner to the processing space of the electric appliance. For this purpose, the device can either directly adjoin the processing space or adjoin a wall thereof and, as an alternative, it can be connected in an air-conducting manner to the processing space by means of an air duct in the form of an air channel or the like, in a manner similar to that known from the abovementioned WO 2013/097975 A1.

As a material for moisture absorption or to absorb water from steam, the device has carbon-based fibres or carbon fibres, which can also have carbon nanotubes, for example. They can also be designed as a layer, i.e. do not necessarily have to extend freely over the entire length.

The carbon-based fibres are designed as a "fibre unit" or formed on such a fibre unit. This means that they are arranged or secured against or on a support. It is advantageous if all the fibres or all of the fibre material is provided on this fibre unit. The precise design thereof is explained in greater detail below but should have a relatively large surface to allow the best possible absorption of moisture from the air. Air can flow along this relatively large surface of the fibre unit with the carbon-based fibres and release its moisture. On the one hand, this surface can be substantially continuous or, as an alternative, it can have passages or apertures in order to achieve better through flow and thus a larger active surface area overall.

The fibre unit is arranged between the processing space or an air duct connected to the processing space, on the one hand, and a dehumidification chamber, on the other hand, thus enabling the carbon-based fibres, on the one hand, to absorb moisture from the air of the processing space and, on the other hand, to release it again. The dehumidification chamber is preferably a part of the dehumidification device and provided therein. Moreover, the carbon-based fibres can be arranged not only in a fixed or immovable manner but also in a movable manner, thus allowing them to be moved to the, or into the, dehumidification chamber to enable them to release their absorbed moisture again. This release can therefore take place in such a way that the moisture is released as water droplets. In particular, these can drip off the carbon-based fibres. This moisture can be collected and drained away in a manner which is conventional per se or, as an alternative, can be reused if required. In the context of the invention, a special behavioural characteristic of such carbon-based fibres can be exploited. Namely: these can absorb water even at a low relative air humidity and can release it again even at a high relative air humidity of 50% to 80%, see above. This process is reversible at any time, wherein it can be assisted or accelerated by drying, in particular by means of heating, as explained in greater detail below. Thus, for example, moisture absorption can rise, i.e. become better, the moister the air is up to a relative air humidity of 50% or even 80%, even at room temperature. This effect can be exploited. In this case, the moisture collects on the surface of the carbon-based fibres, then runs down and is thus concentrated at a lower end or end region, from where the water can just drip off by virtue of the accumulated quantity. It is also advantageous here that the relative air humidity can quite easily be lower where the fibre unit is supposed to absorb the moisture, i.e. in or at the processing space, than where the moisture is supposed to be released again as water. The result is that particularly good dehumidification of the air of the processing space is made possible. Moreover, it has been found in the context of the invention that, where regeneration of the carbon-based fibres is thermally assisted, lower temperatures are sufficient than, for example, with the zeolite materials from the prior art which were mentioned at the outset.

As an alternative to release of the moisture of the carbon-based fibres in the dehumidification chamber in liquid form or as water, release by evaporation from the carbon fibres is also a possibility. However, higher temperatures are likely to be required than for assistance of the regeneration of the carbon fibres by heating, as mentioned above.

As a development of the invention, heating means that have already been mentioned, which can further assist regeneration or drying of the carbon-based fibres, can be provided in the dehumidification chamber. In this way, residual moisture, possibly contained at a deeper level in an assembly of the fibres, can be removed. The heating means can be of many different designs, in particular being selected from a group comprising induction heaters, radiant heaters, thick film heaters and hot air heaters. It is likewise possible to dry the carbon-based fibres by using microwaves. The possible assistance of the heat output by means of movement of air or through-ventilation is also regarded as advantageous for accelerating heating.

As a development of the invention, the carbon-based fibres can extend in elongate fashion on the fibre unit. It is particularly advantageous here if they are rectilinear, thus enabling the above-described formation of water droplets by water that is running down to be promoted. In an advantageous development of the invention, the fibres extend at least in part obliquely or with a vertical direction component, and it is particularly advantageous if they extend largely or completely vertically.

In principle, the carbon-based fibres can be in any form, e.g. as a kind of braided fabric, knitted fabric or non-crimp fabric. Thus, the fibre unit then has a kind of textile fibre material composed of carbon-based fibres. Especially if such a textile material is produced in relatively loose fashion, it has a large surface area and thus a good capacity for the absorption of moisture from steam or from the air of the processing space.

In an alternative development of the invention, the carbon fibres can extend freely in the manner of fibre bundles, in particular rectilinear fibre bundles. It is then particularly readily possible to give these fibre bundles or the carbon-based fibres a vertical direction of extent and thus enable moisture to be collected or released by dripping down. These carbon-based fibres can then be secured so as to hang as a kind of curtain or the like, wherein the lower ends thereof should preferably remain free to allow better dripping.

As a development of the invention, not only is the fibre unit arranged between the processing space or a corresponding air duct and the dehumidification chamber but it can be moved therebetween. It can either be movable in itself or, as it were, capable of being moved backward and forward or of being moved in rotation or in a circulating manner. In this way, it can absorb moisture from the air in the processing space or in an air channel as an air duct. The individual fibres can then be moved to the dehumidification chamber or into the dehumidification chamber, where they can release the moisture again in the manner described above. As a movement, a continuous movement such as a rotation or circulation is preferred since this is technically easier to achieve and allows continuous operation or continuous dehumidification. The fibre unit can be of drum-shaped or roll-shaped design, for example, advantageously with the carbon-based fibres on an outer side. As an alternative, the fibre unit can be a circulating belt, and this too can have the carbon fibres or can even be formed at least partially or largely from the fibres. Here too, it is advantageous, precisely because of revolving rollers or the like, if the carbon fibres are provided at least on the outer side. This also improves moisture absorption.

In an advantageous development of the invention, the dehumidification chamber is connected to a water tank, and a water line may possibly be provided for this purpose. In this case, the water tank is advantageously arranged below the dehumidification chamber to allow automatic introduction of liquid. Thus, for example, an abovementioned water line, which proceeds from a lower end of the dehumidification chamber, can be used to carry liquid to a water tank arranged thereunder. A water tank of this kind can also be arranged removably in the appliance, thus allowing it to be removed to empty the accumulated water. This is known from a large number of appliances, e.g. condensation laundry dryers.

It is advantageous if the carbon-based fibres are uncovered at least one end, possibly also in a relatively large central region. Particularly if they are arranged largely vertically and the dehumidification is supposed to take place principally by moisture collecting on the fibres and then running down thereon and dripping off as water droplets, the lower ends should be uncovered or exposed. For this purpose, a length of a few millimetres can be sufficient, e.g. 2 mm to 5 mm. The carbon-based fibres can also be uncovered or exposed in an upper end region. Overall, they should be exposed to a relatively large or to a predominant extent, preferably with more than 50% or even more than 80% of their length.

It is advantageous if the carbon-based fibres are arranged in the upper region in the dehumidification chamber. This allows water to drip off well. They should extend at least as far as an upper half. They are preferably at a certain distance from a lower base of the dehumidification chamber, thus allowing water to collect there.

As a development of the invention, provision can be made for the dehumidification chamber to be largely sealed relative to the processing space. In this way, it is possible to prevent air with a relatively high relative humidity from passing back from the dehumidification chamber into the processing space, possibly directly or via an air duct described above. In this case, seals can be provided, against which the fibre unit rests and past which it moves. Particularly if a seal rests directly against the carbon-based fibres, it should be sufficiently soft to cause no damage to the fibres during a relative movement against each other. Hermetic sealing is not required here. If possible, the seal should also not scrape off any of the moisture collected on the fibres again in such a way that it remains in the processing space.

In principle, therefore, the invention envisages that moisture is absorbed from a processing space or an air duct connected to the processing space and introduced into the dehumidification chamber by means of the carbon-based fibres or the carbon fibres with the collected moisture are moved accordingly. In the dehumidification chamber, the moisture is then collected as water and discharged or stored. The carbon-based fibres from which moisture has been removed or which have been at least partially dried are then reintroduced into the processing space or moved to the air duct in order once again to absorb moisture. In the dehumidification chamber, the carbon-based fibres may possibly be heated in order to remove moisture from them or dry them more quickly and/or more thoroughly.

As possible electric appliances, apart from the abovementioned washing machines and washer dryers and dishwashers, cooking appliances such as baking ovens or steamers can also be provided with a device of this kind. They can likewise be used in air-conditioning appliances and extractor hoods. The particularly advantageous properties of carbon-based fibres can be exploited here. Moreover, even when there is additional heating of said fibres, which entails a certain energy requirement, a necessary temperature can still be kept below that which is required, for example, in the prior art for the use of a zeolite.

A device of this kind can also be combined with an upstream heat exchanger. Thus, it is possible to provide in the dehumidification chamber a space that has a higher relative air humidity, which can then, in turn, be regulated. As an alternative, an electric appliance can have a heat exchanger which is arranged downstream of the device for dehumidification or into which already dehumidified air flows before it then advantageously flows back into the electric appliance. As an alternative, the heat exchanger can be arranged upstream of the device for dehumidification.

In the case of a dishwasher too, the invention can be used advantageously since it is then possible to reduce waiting times for the opening of the door since lower temperatures for drying the dishes are also possible.

These and further features will become apparent not only from the claims but also from the description and the drawings, wherein the individual features can each be implemented in isolation or in combination in the form of subcombinations in an embodiment of the invention and can be implemented in different areas and can form embodiments which are advantageous and capable of being protected independently, for which protection is claimed here. The subdivision of the application into individual sections and subtitled portions does not restrict the generality of the statements made therein.

BRIEF DESCRIPTION OF THE SEVERAL VIEWS OF THE DRAWINGS

Illustrative embodiments of the invention are shown schematically in the drawings and are explained in greater detail below. In the drawings.

DETAILED DESCRIPTION

Figure 1:
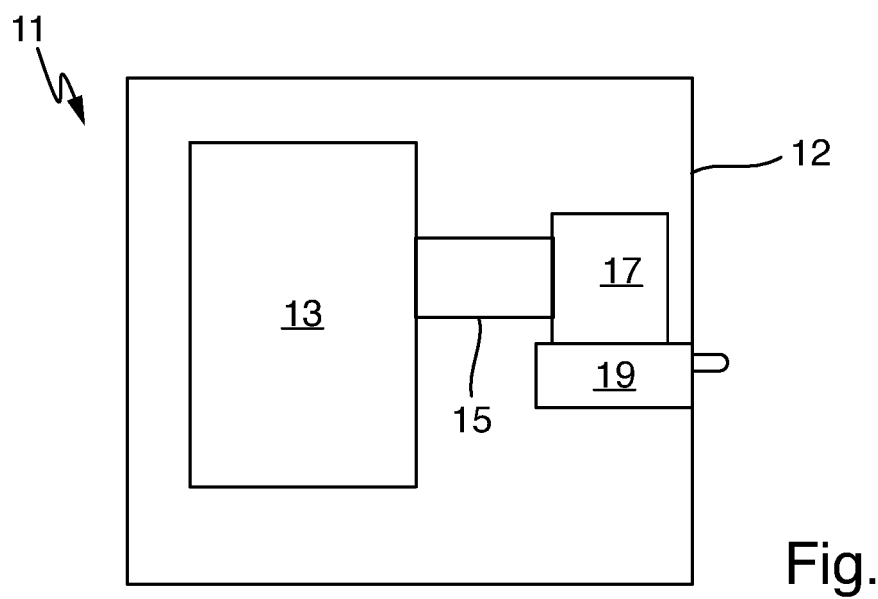
FIG. 1 shows a highly schematized illustration of a construction of a dishwasher as an electric appliance according to the invention.

In FIG. 1, a dishwasher 11 is illustrated very schematically as an electric appliance according to the invention, having, in a conventional manner, a housing 12 with a washing chamber 13 therein. The washing chamber 13 is connected on the rear side, by means of an air channel 15 as an air duct, to a device 17 according to the invention for the dehumidification of air in the washing chamber 13. Shown below the device 17 is a water tank 19, which can be removable from the dishwasher 11. However, it is not an essential feature.

Figure 2:
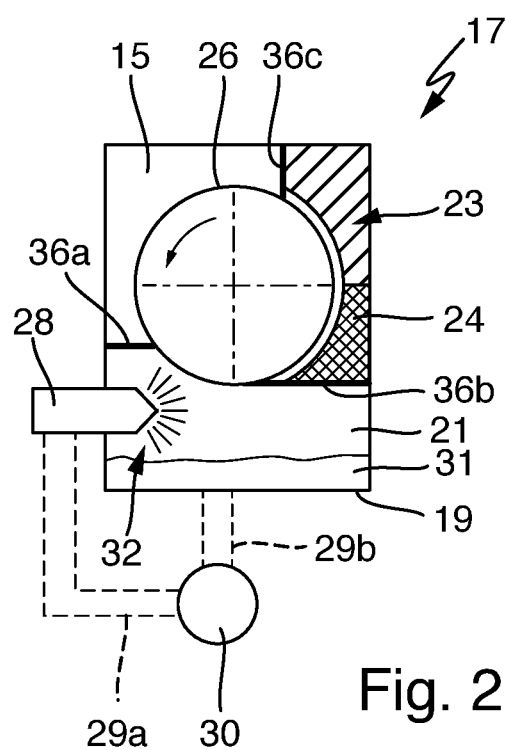
FIGS. 2 and 3 show somewhat more detailed schematic illustrations of a construction of a device according to the invention for dehumidification.
Figure 3:
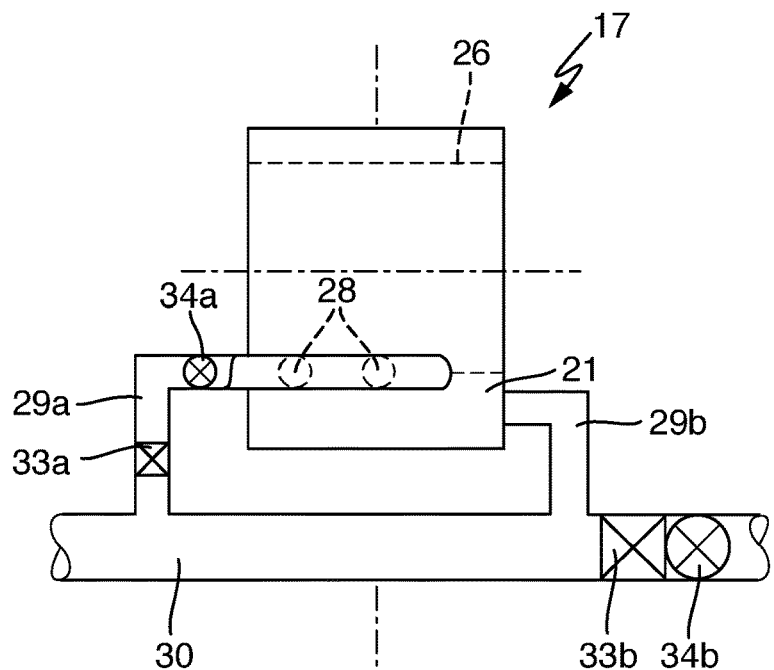

FIGS. 2 and 3 illustrate a device 17 according to the invention for dehumidification in somewhat greater detail, firstly in section from the side and then from the front. The device 17 is connected to or placed against an air channel 15. The heart of the device 17 is a fibre unit 26 in the form of a rotating drum, which rotates anticlockwise in FIG. 2. As explained above, the fibre unit 26 is provided on the outer side thereof with carbon-based fibres, e.g. in the form of a sheet-like configuration, preferably as a textile or textile material. It can be in the form of a mat or of a fabric with a large effective surface area for the best possible absorption of moisture, as explained at the outset.

The device 17 has a dehumidification chamber 21, which adjoins this fibre unit 26 at the bottom or adjoins a first part thereof. Arranged towards the top right, following the passage of the fibre unit 26, is a heating chamber 23 as a second part for dehumidification. A heating element 24 is illustrated schematically in the heating chamber 23, ensuring complete regeneration or removal of moisture from and thus drying of the carbon-based fibres or of the fibre unit 26. The heating element 24 can be one of those mentioned at the outset, advantageously a radiant heater, in particular with hot air assistance.

The air channel 15, the dehumidification chamber 21 and the heating chamber 23 are sealed off from one another by seals 36a, 36b and 36c. These can be relatively soft or flexible rubber seals or the like, for example, which are intended to prevent, at least to a large extent, air transfer between the various regions or chambers along the fibre unit 26.

Arranged on the left in the dehumidification chamber 21 or the first part thereof is a nozzle 28, which is used to achieve a higher air humidity in this region. Injecting water into the dehumidification chamber 21 ensures that the carbon-based fibres of the fibre unit 26 release their moisture even better, and this can then drip downwards as water 31 into the indicated water tank 19.

Water 31 can drain downwards out of the water tank 19 by means of a pipe 29b, which leads to a line 30. From there, the water can be carried away by means of a valve 33b and/or a pump 34b. As an alternative, water can be passed to the nozzles 28 by means of a valve 33a and the pump 34a and can then be injected or misted into the dehumidification chamber 21. This is intended to intensify moisture removal from the carbon-based fibres.

A speed of rotation of the fibre unit 26 in the form of the drum should not be too high. It is regarded as important and advantageous if the dwell time of the individual carbon-based fibres in each of the three regions is several seconds, thus allowing the respective processes of moisture absorption and moisture release to take place successfully. No drives are shown for the fibre unit 26 but these can be implemented easily by a person skilled in the art.

The heating element 24 in the heating chamber 23, as the second part of the dehumidification chamber, does not have to generate a particularly high temperature for complete regeneration or drying of the fibre unit 26. Temperatures of 100° C. to 400° C. are regarded as adequate and, under some circumstances, even temperatures of up to 200° C. are sufficient. By means of air assistance during heating, that is to say, as it were, by hot air, it is possible to ensure that drying is achieved even down into the textile material composed of carbon-based fibres.

Figure 4:
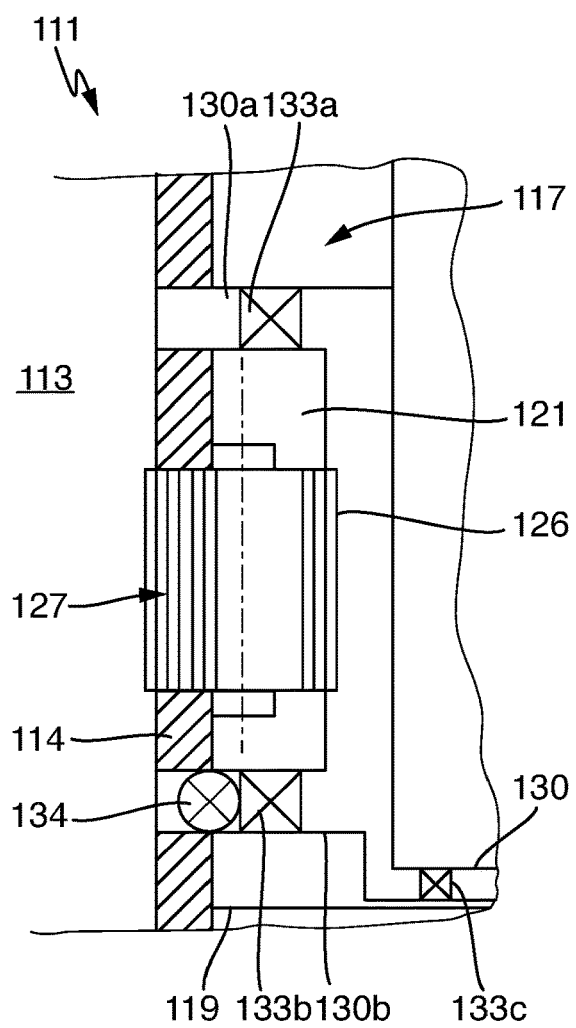
FIG. 4 shows an alternative embodiment of a device according to the invention for dehumidification in another dishwasher according to the invention.

FIG. 4 illustrates an alternative embodiment of a dishwasher 111 as an electric appliance according to the invention with a further device 117 according to the invention for dehumidification. The device 117 is directly attached to a chamber wall 114 of the washing chamber 113, advantageously a rear wall. A drum-shaped rotating fibre unit 126 projects at least partially into the washing chamber 113 through a corresponding, accurately fitting opening. Once again, seals can be provided here. Vertically extending carbon-based fibres 127 are illustrated schematically on the outer side of the fibre unit 126. They can be secured relatively loosely thereon, in particular with exposed central regions and lower end regions.

Illustrated behind the chamber wall 114 is a dehumidification chamber 121, in which the major part of the fibre unit 126, in particular the vertical axis of rotation thereof (illustrated by a dash-dotted line), is situated. A water tank 119 is illustrated schematically below the fibre unit 126. Water that has been released by the fibre unit 126 can be drained away or discharged from the water tank by means of a line 130 and a valve 133c.

For further possible water conduction, in particular also back to the washing chamber 113, lines 130a and 130b, together with valves 133a and 133b, are illustrated. A pump 134 is also arranged in the lower line 130b.

In the dishwasher 11 or 111 according to the invention, the device 17 or 117 according to the invention for dehumidification serves to accelerate the drying of dishes after the washing thereof has finished. This drying is performed with very hot air, which is blown into the washing chamber 13 or 113. Accelerated drying is very desirable here. However, the invention can also be used to similar advantage with the other appliances mentioned at the outset.

Figure 5:
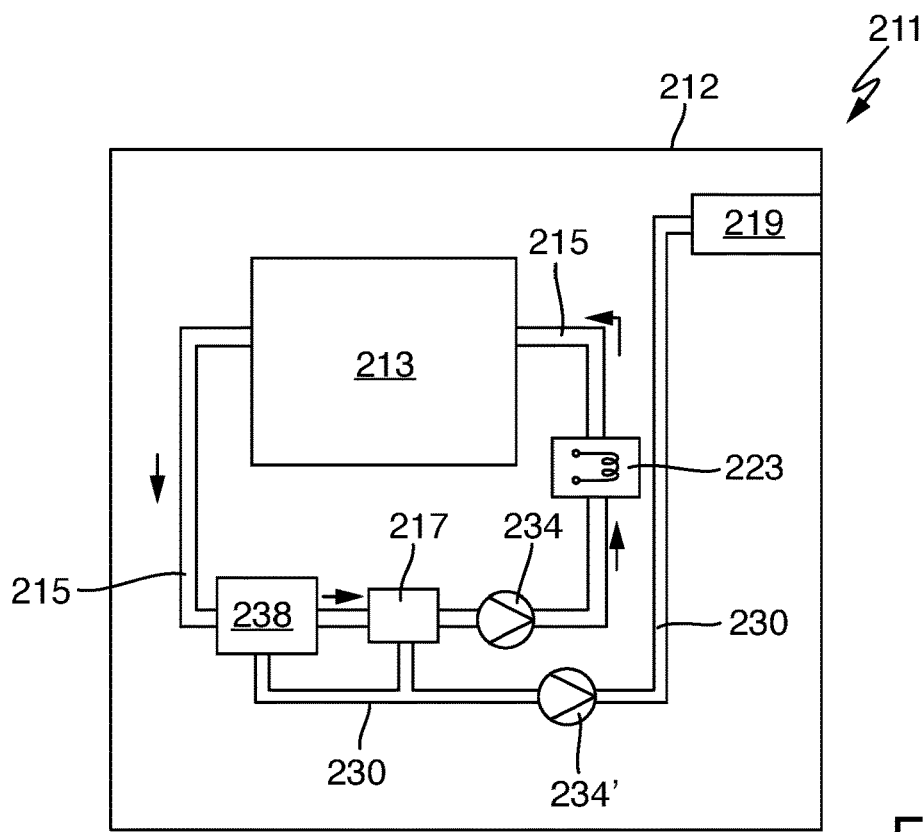
FIG. 5 shows a schematic illustration of a condensation dryer according to the invention with dehumidification.

FIG. 5 illustrates a condensation dryer 211 as a further electric appliance according to the invention. A dryer chamber 213 is provided in a housing 212 of the condensation dryer 211 and is connected to an, as it were, encircling air channel 215. Moist air from the dryer chamber 213 passes through the air channel 215 into a heat exchanger 238 and then into the device 217 for dehumidification. After this, the dehumidified air is pumped into a heating device 223 by a first pump 234. The dehumidified and heated air is then pumped back into the dryer chamber 213 again via the air channel 215.

Without being illustrated in detail, the air, optionally after heating, is to be dehumidified as described above in the device 217 for dehumidification.

A line 230, in which water is collected, runs underneath the device 217 and the heat exchanger 238. This water is pumped into a water tank 219 by means of a second pump 234'. From there, the water can be extracted or discharged or, as an alternative, the water tank 219 can also be of removable design to enable it to be emptied.

Figure 6:
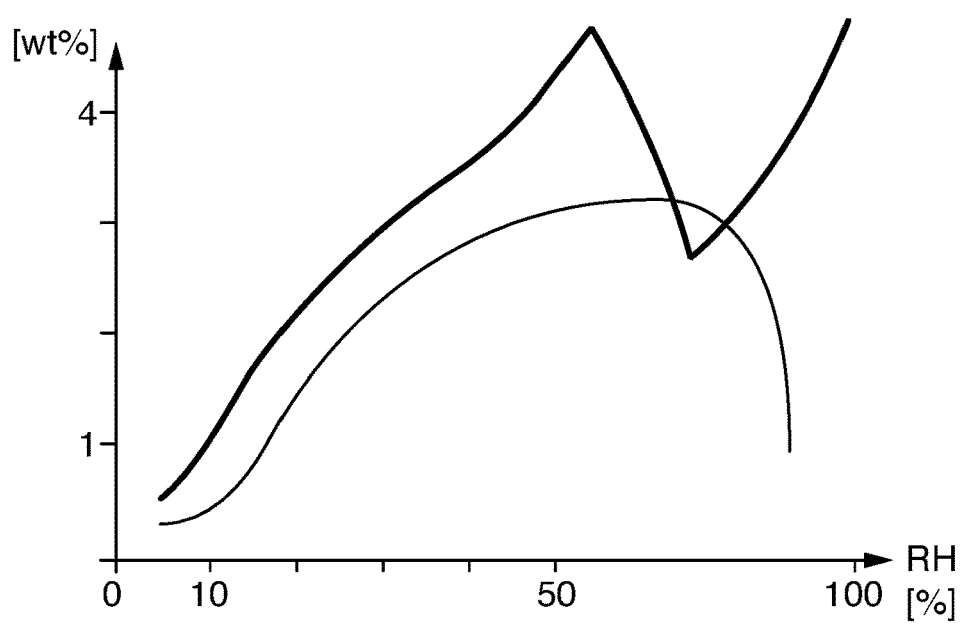
FIG. 6 shows a diagram illustrating two characteristics for water absorption capacity against relative air humidity.

Two possible characteristics representing the capacity for moisture absorption or water absorption are illustrated in FIG. 6 against the relative humidity RH. The temperature is about 25° C. The thin characteristic has been recorded for fibres which comprise 0.1 M FeCl3. It can be seen here that the capacity for moisture absorption even rises up to a relative humidity of just under 80%.

The thick characteristic applies to fibres comprising 0.2 M FeCl3. The special feature here is that the capacity for moisture absorption rises sharply up to a relative air humidity RH of about 60% and is almost twice as great as at a relative air humidity of 30%, for example. The characteristic then collapses, as it were, after which it rises sharply again.

That which is claimed:

1. A device for the dehumidification of air in a processing space of an electric appliance, wherein:
   said device is connectable in an air-conducting manner to said processing space of said electric appliance;
   said device comprises carbon-based fibres;
   said carbon-based fibres are designed as a fibre unit;
   said fibre unit is arranged between said processing space or an air duct and at least one dehumidification chamber for ensuring that said carbon-based fibres release absorbed moisture in said dehumidification chamber;
   said air duct is connected to said processing space for ensuring that said carbon-based fibres absorb moisture there from air of said processing space;
   heating means for regeneration or drying of said carbon-based fibres are provided in said dehumidification chamber; and
   said heating means in said dehumidification chamber are selected from a group of: induction heaters, radiant heaters, thick film heaters, and hot air heaters.

2. The device according to claim 1, wherein said carbon-based fibres are designed to extend in elongate fashion.

3. The device according to claim 1, wherein said fibre unit is of drum-shaped or roll-shaped design or is designed as a circulating belt, with said carbon-based fibres on an outer side.

4. The device according to claim 1, wherein:
   said dehumidification chamber is connected to a water tank by a water line; and
   said water line proceeds from a lower end of said dehumidification chamber to said water tank arranged thereunder.

5. The device according to claim 4, wherein said water tank is arranged removably in said appliance.

6. The device according to claim 1, wherein said carbon-based fibres are uncovered or exposed at, at least one end.

7. The device according to claim 6, wherein said carbon-based fibres are uncovered or exposed and movable over a length of at least 2 mm to 5 mm.

8. The device according to claim 6, wherein said carbon-based fibres are also uncovered or exposed at another end.

9. The device according to claim 1, wherein said carbon-based fibres in said dehumidification chamber are arranged in an upper region of said dehumidification chamber.

10. The device according to claim 9, wherein said carbon-based fibres in said dehumidification chamber are arranged in said upper half of said dehumidification chamber and at a distance from a lower base of said dehumidification chamber.

11. The device according to claim 1, wherein said dehumidification chamber is largely sealed relative to said processing space by seals against which said fibre unit rests or past which it moves.

12. A device for the dehumidification of air in a processing space of an electric appliance, wherein:
   said device is connectable in an air-conducting manner to said processing space of said electric appliance;
   said device comprises carbon-based fibres;
   said carbon-based fibres are designed as a fibre unit;
   said fibre unit is arranged between said processing space or an air duct and at least one dehumidification chamber for ensuring that said carbon-based fibres release absorbed moisture in said dehumidification chamber;
   said air duct is connected to said processing space for ensuring that said carbon-based fibres absorb moisture there from air of said processing space; and said fibre unit is movable between said processing space or an air channel connected to said processing space of said appliance, on the one hand, and said dehumidification chamber, on the other hand.

13. The device according to claim 12, wherein said movement of fibre unit is a rotation.

14. A method for operating a device according to claim 1 or claim 12, said method comprising:
moving said fibre unit with said carbon-based fibres, either into said processing space of said electric appliance or to an air duct, wherein said air duct is connected in an air-conducting manner to said processing space of said appliance, wherein said carbon-based fibres absorb moisture from said air of said processing space during said process;
subsequently moving said fibre unit in such a way that said carbon-based fibres are moved at least partially into said dehumidification chamber;
said carbon-based fibres release said absorbed moisture;
collecting said moisture released by said carbon-based fibres; and
moving said fibre unit with said carbon-based fibres once again in such a way to be connected in an air-conducting manner to said processing space of said electric appliance for renewed absorption of moisture.

15. The method according to claim 14, wherein:
said carbon-based fibres or said fibre unit is rotated during its movement of said carbon-based fibres between said processing space and said dehumidification chamber.

16. The method according to claim 14, wherein said carbon-based fibres are heated or supplied with heated air to release said moisture.

17. The method according to claim 14, wherein said carbon-based fibres release said absorbed moisture in liquid form.

18. The method according to claim 17, wherein said dehumidification chamber is connected to a water tank by a water line; said water line proceeds from a lower end of said dehumidification chamber to said water tank arranged thereunder; and for said purpose of said carbon-based fibres to release said absorbed moisture in liquid form, said carbon-based fibres extend substantially vertically in said dehumidification chamber so that said moisture collects in form of water droplets at a lower end of said carbon-based fibres and drips downwards so that said water flows into said water tank.

* * * * *